United States Patent [19]

Konno et al.

[11] Patent Number: 5,546,270

[45] Date of Patent: Aug. 13, 1996

[54] APPARATUS FOR SUPPORTING A DISPLAY DEVICE IN A PLURALITY OF POSITIONS

[75] Inventors: Masaki Konno; Shuji Ito, both of Yokohama, Japan

[73] Assignee: Matsushita Electric Industrial Co., Ltd., Osaka, Japan

[21] Appl. No.: 291,908

[22] Filed: Aug. 18, 1994

[30] Foreign Application Priority Data

Sep. 14, 1993 [JP] Japan ................................ 5-228832

[51] Int. Cl.6 ........................................................... B41J 3/20
[52] U.S. Cl. ...................... 361/680; 400/692; 400/693; 400/88; 400/613; 361/685; 361/681; 248/288.31; 248/288.51
[58] Field of Search .................... 400/691, 692, 400/693, 690.4; 248/917–923, 481, 288.31, 288.51; 364/708.1; 361/681, 682; 312/223.2, 327, 328

[56] References Cited

U.S. PATENT DOCUMENTS

| 4,549,710 | 10/1985 | Prince et al. ............................. 248/183 |
| 4,636,781 | 1/1987 | Wills et al. ............................... 340/700 |
| 4,641,980 | 2/1987 | Matsumoto et al. ..................... 400/120 |
| 4,744,680 | 5/1988 | Hirosaki et al. ......................... 400/120 |
| 5,017,033 | 5/1991 | Hermann et al. ........................ 400/693 |
| 5,353,360 | 10/1994 | O'Bara ....................................... 382/65 |

FOREIGN PATENT DOCUMENTS

| 1108973 | 7/1989 | Japan ................................ H05K 5/02 |
| 418385 | 1/1992 | Japan ................................ B41J 29/00 |
| 5238030 | 9/1993 | Japan ................................ B41J 2/325 |

*Primary Examiner*—Leo P. Picard
*Assistant Examiner*—Phuong T. Vu
*Attorney, Agent, or Firm*—Pollock, Vande Sande & Priddy

[57] ABSTRACT

An electronic apparatus includes a main body and a front panel. A hinge rotatably connects the front panel to the main body. A socket is connected to the front panel. A hemispherical member is connected to a display. The hemispherical member is rotatably received by the socket. The hemispherical member is pressed against the socket. A holder has a recess in which at least a portion of the display is disposed. A first shaft projects upward from a center of an upper portion of the display. A second shaft projects downward from a center of a lower portion of the display. The holder has a first groove into which the first shaft extends. The holder has a second groove into which the second shaft extends. The first and second shafts are movable in the first and second grooves.

5 Claims, 8 Drawing Sheets

APPARATUS FOR SUPPORTING A DISPLAY DEVICE IN A PLURALITY OF POSITIONS

BACKGROUND OF THE INVENTION

1. Field of the Invention

This invention generally relates to an electronic apparatus having a display. This invention particularly relates to, for example, a computer or a terminal device placed on a counter in a bank or a post office.

2. Description of the Prior Art

In some of banks and post offices, terminal devices or computers are placed on a counter, and members of the staff behind the counter use them in business with customers. Generally, a free space on the counter is narrow. Accordingly, it is desirable that a display and a printer of the terminal device can be controlled by the operator at a common front face of the terminal device.

Typical prior-art displays of terminal devices or computers can not be easily changed in direction. In addition, a wider free space is necessary to allow a change in direction of the display.

Regarding use of such a terminal device or a computer in a narrow space, a desirable convenient configuration is that a printer is close to an input device and a display of the terminal device or the computer.

Japanese published unexamined utility model application 1-108973 discloses a modified ball-and-socket joint for rotatably mounting a display on a support. The modified ball-and-socket joint includes a hemisphere rotatably received by a socket. Rotation of the hemisphere relative to the socket enables a change in direction of the display.

SUMMARY OF THE INVENTION

It is an object of this invention to provide a convenient electronic apparatus.

It is another object of this invention to provide a compact electronic apparatus.

A first aspect of this invention provides an electronic apparatus comprising a main body; a front panel; a hinge for rotatably connecting the front panel to the main body; a display; a socket connected to the front panel; a hemispherical member being connected to the display and being rotatably received by the socket; and means for pressing the hemispherical member against the socket.

The electronic apparatus may further comprise a holder having a recess in which at least a portion of the display is disposed, a first shaft projecting upward from a center of an upper portion of the display, and a second shaft projecting downward from a center of a lower portion of the display, the holder having a first groove into which the first shaft extends, the holder having a second groove into which the second shaft extends, wherein the first and second shafts are movable in the first and second grooves.

The electronic apparatus may further comprise a printer; means for movably connecting the printer to the main body; and a flexible cable for electrically connecting the main body and the printer; wherein the front panel is rotatable between a closed position and an open position; the front panel blocks and unblocks a path of movement of the printer when the front panel assumes the closed position and the open position respectively; and the printer is movable into and from a retracted position within the main body in cases where the front panel is in the open position.

A second aspect of this invention provides an electronic apparatus comprising a main body; a front panel; a hinge for rotatably connecting the front panel to the main body; a display; means for connecting the display to the front panel; means for enabling rotation of the display in all directions relative to the front panel; a printer; and means for movably connecting the printer to the main body; wherein the front panel is rotatable between a closed position and an open position; the front panel blocks and unblocks a path of movement of the printer when the front panel assumes the closed position and the open position respectively; and the printer is movable into and from a retracted position within the main body in cases where the front panel is in the open position.

DESCRIPTION OF THE PREFERRED EMBODIMENTS

First Embodiment

Figure 1:
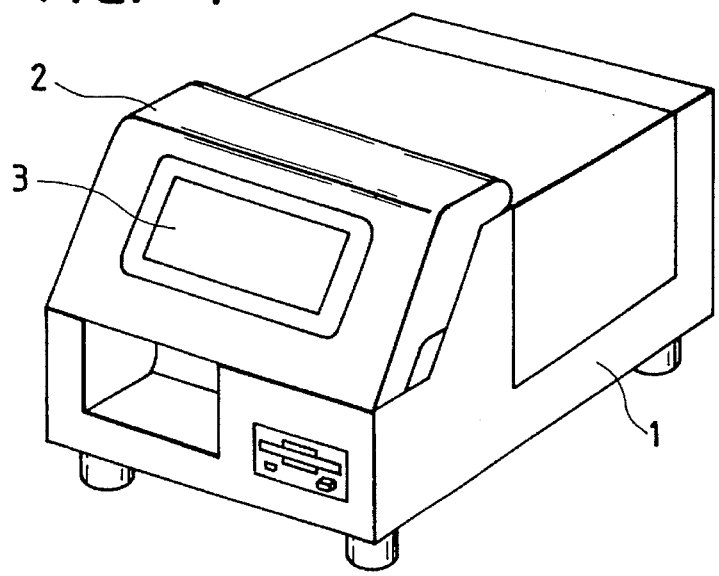
FIG. 1 is a perspective view of an electronic apparatus according to a first embodiment of this invention.

With reference to FIG. 1, an electronic apparatus includes a main body 1 having a front panel 2. A display 3 is movably or rotatably mounted on the front panel 2 by a modified ball-and-socket joint (a hemisphere-and-socket joint) as will be described later.

Figure 3:
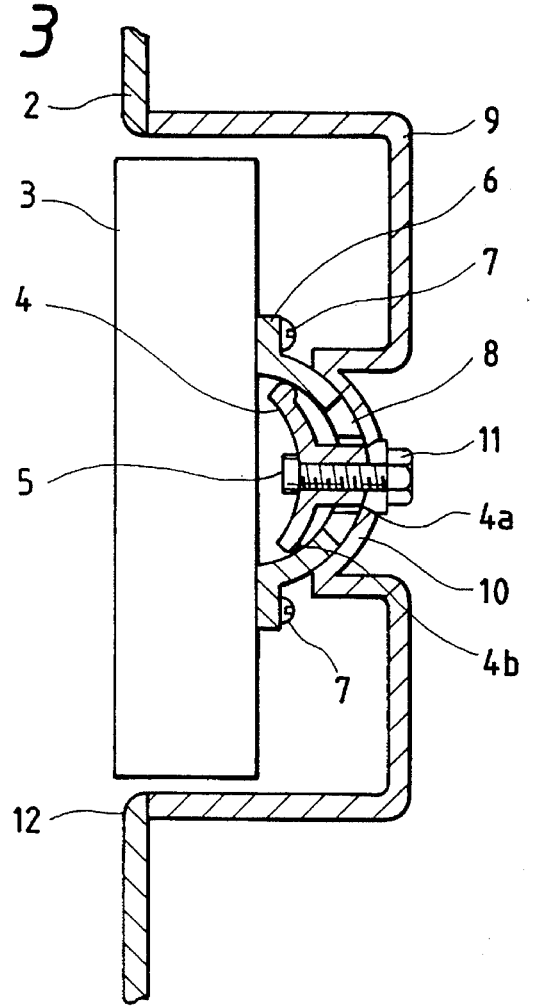
FIG. 3 is a sectional view of the display and associated members in the electronic apparatus of FIG. 1.
Figure 2:
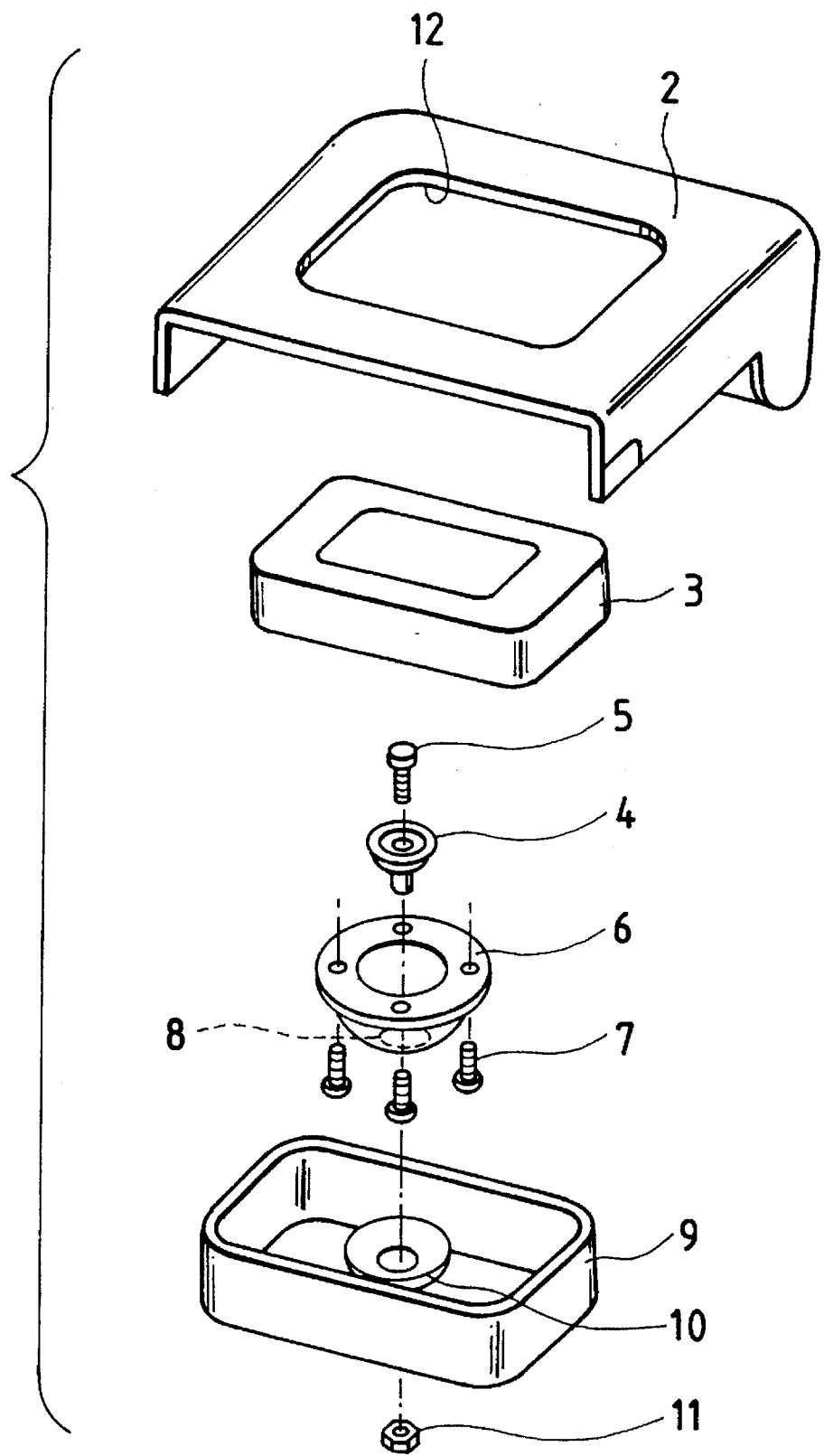
FIG. 2 is an exploded view of a front panel, a display, and associated members in the electronic apparatus of FIG. 1.

As shown in FIGS. 2 and 3, the front panel 2 has a rectangular opening 12. A holder or casing 9 in the form of a box is attached to the front panel 2. The holder 9 defines a recess which aligns with and opens at the rectangular opening 12 in the front panel 2. The display 3 is located in the holder 9.

The modified ball-and-socket joint includes a member 6 having a hemispherical outer surface. The hemispherical member 6 is attached to the display 3 by screws 7. A central portion of the bottom walls of the holder 9 forms a hemispherical socket 10 receiving the hemispherical member 6. The hemispherical socket 10 is another component of the modified ball-and-socket joint. The hemispherical member 6 and the hemispherical socket 10 are designed so that the member 6 can slide on the socket 10. The socket 10 has a spherical surface defining a recess into which a part of the hemispherical member 6 fits. The spherical surface of the socket 10 substantially conforms to the corresponding spherical surface of the spherical member 6.

A spring 4 has a dish, and a shaft 4a integrally extending from a central portion of the dish. The spring 4 has an axial hole which aligns with a hole in a center of the socket 10. A screw 5 extends through the holes in the spring 4 and the socket 10. The screw 5 has a head abutting against a front surface of a central portion of the dish of the spring 4. A nut 11 in engagement with an end of the screw 5 abuts against a back surface of the socket 10. The spring 4 is attached to the socket 10 by the combination of the screw 5 and the nut 11.

The hemispherical member 6 has a hemispherical interior in which the dish of the spring 4 is located. A top of the hemispherical member 6 has a circular opening 8 through which the shaft 4a of the spring 4 extends. A back of an edge of the dish of the spring 4 has projections 4b abutting against the hemispherical member 6. The spring 4 presses the hemispherical member 6 against the socket 10. The hemispherical member 6 and the projections 4b of the dish of the spring 4 are designed so that the hemispherical member 6 can slide on the projections 4b. The opening 8 in the hemispherical member 6 has a size which is greater than an outside diameter of the shaft 4a of the spring 4 to allow rotation of the hemispherical member 6 relative to the socket 10 and the spring 4. The hemispherical member 6 is allowed to rotate in all directions within a given limited angular range. Thus, the display 3 is allowed to rotate in all directions within a given limited angular range.

Figure 4:
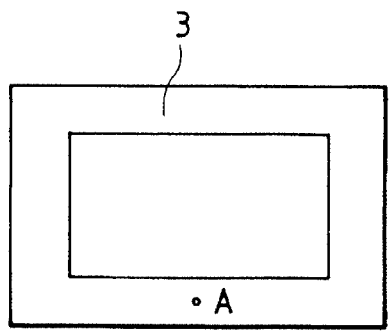
FIG. 4 is a front view of the display in the electronic apparatus of FIG. 1.
Figure 5:
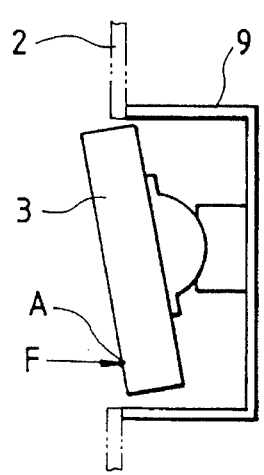
FIG. 5 is a sectional view of the display and the associated members in the electronic apparatus of FIG. 1.

With reference to FIGS. 4 and 5, when a lower central point "A" of the display 3 is pressed inward by a force "F", the display :3 is rotated relative to the holder 9 and the front panel 2 and is thus moved from an erect position to a tilt position at which the display 3 inclines to the downward direction.

Figure 6:
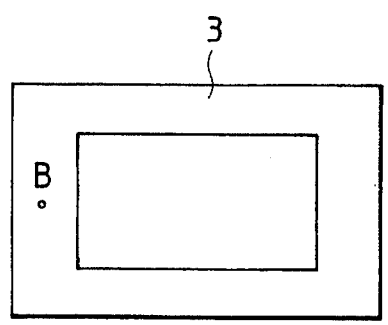
FIG. 6 is a front view of the display in the electronic apparatus of FIG. 1.
Figure 7:
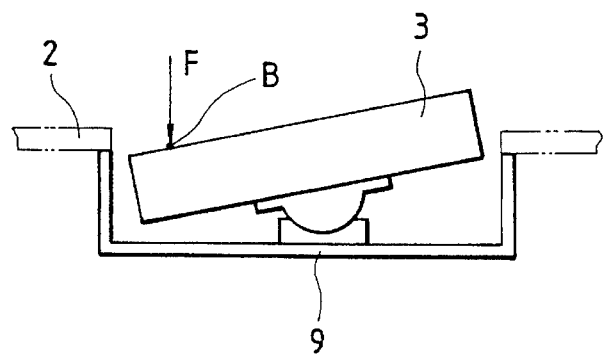
FIG. 7 is a sectional view of the display and the associated members in the electronic apparatus of FIG. 1.

With reference to FIGS. 6 and 7, when a left-hand central point "B" of the display 3 is pressed inward by a force "F", the display 3 is rotated relative to the holder 9 and the front panel 2 about the vertical axis and is thus moved from a frontwardly-facing position to a leftwardly inclined position at which the direction of the display 3 differs from the frontward direction with respect to the front panel 2.

Figure 8:
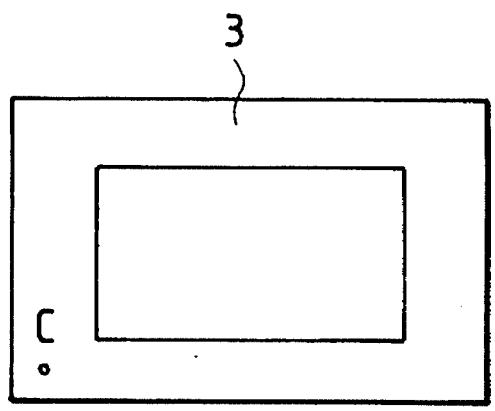
FIG. 8 is a front view of the display in the electronic apparatus of FIG. 1.
Figure 10:
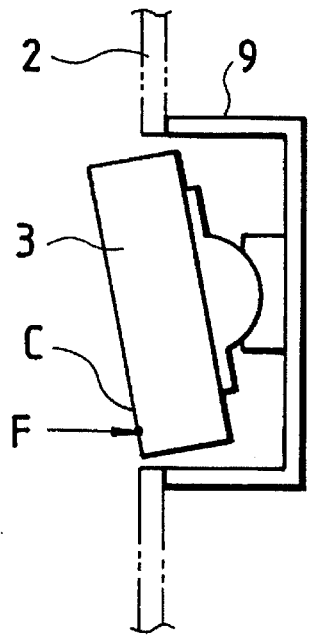
FIG. 10 is a sectional view of the display and the associated members in the electronic apparatus of FIG. 1.
Figure 9:
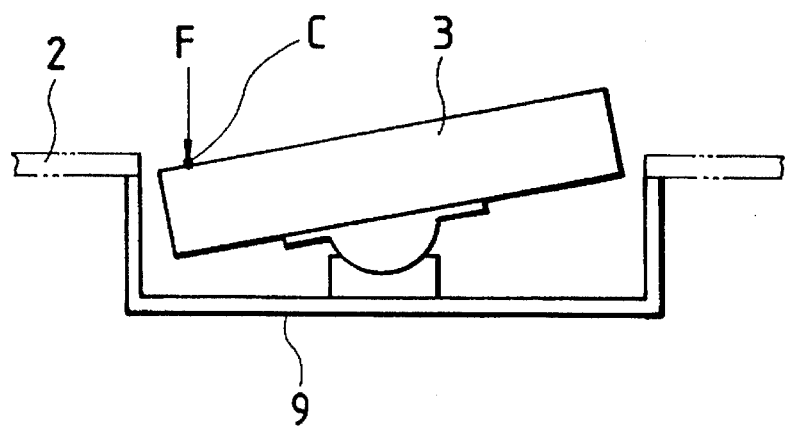
FIG. 9 is a sectional view of the display and the associated members in the electronic apparatus of FIG. 1.

With reference to FIGS. 8, 9, and 10, when a left-hand lower corner "C" of the display 3 is pressed inward by a force "F", the display 3 is rotated relative to the holder 9 and the front panel 2 and is thus moved from a frontwardly-facing erect position to a tilt position at which the display 3 inclines to the downward direction and the leftward direction with respect to the front panel 2.

The electronic apparatus is advantageous in that the direction of the display 3 can be easily changed relative to the apparatus body 1. As shown in FIGS. 3, 5, 7, 9 and 10, a major portion of the display 3 extends in the recess defined by the holder 9. Thus, only a very small free space near the front panel 2 is sufficient to allow change of the direction of the display 3.

Second Embodiment

Figure 11:
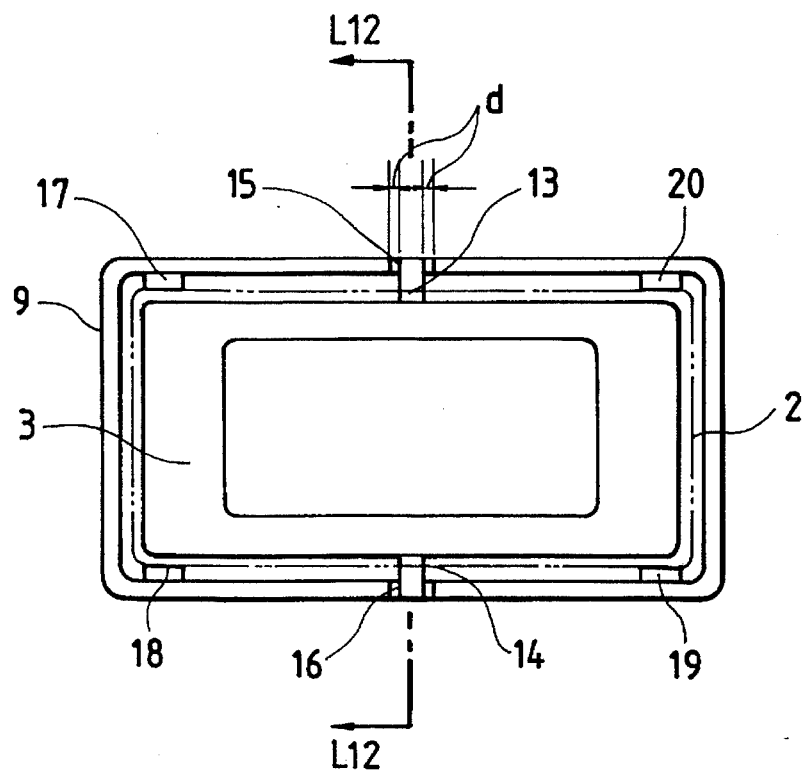
FIG. 11 is a sectional view of a display and a holder in an electronic apparatus according to a second embodiment of this invention which is taken along a plane parallel to a front face of the display.
Figure 12:
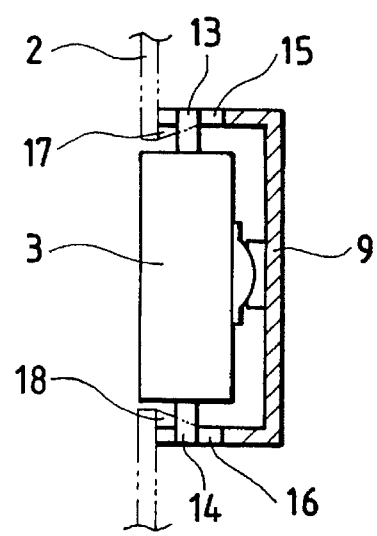
FIG. 12 is a sectional view of the display and associated members in the second embodiment which is taken along the line L12—L12 in FIG. 11.

FIGS. 11 and 12 show a second embodiment of this invention which is similar to the embodiment of FIGS. 1–10 except for additional arrangements indicated hereinafter.

In the embodiment of FIGS. 11 and 12, a display 3 is provided with shafts 13 and 14. The shaft 13 projects upward from a center of an upper portion of the display 3. The shaft 14 projects downward from a center of a lower portion of the display 3. A center of an upper portion of a holder 9 has a groove or an aperture 15 into which the shaft 13 extends. A center of a lower portion of the holder 9 has a groove or an aperture 16 into which the shaft 14 extends. Sizes of the shafts 13 and 14 and sizes of the grooves 15 and 16 are chosen so that the shafts 13 and 14 are spaced from the walls of the holder 9 by a predetermined gap "d" when the display 3 assumes a normal position relative to the holder 9.

Inward projections or guides 17, 18, 19, and 20 are provided on the holder 9. The guides 17, 18, 19, and 20 are located at the left-hand upper corner, the left-hand lower corner, the right-hand lower corner, and the right-hand upper corner of a rectangular recess defined by the holder 9 respectively. The guides 17, 18, 19, and 20 extend at a mouth of the recess defined by the holder 9. As shown in FIG. 12, the guides 17, 18, 19, and 20 taper so that the thickness thereof decreases along a direction of a depth of the recess defined by the holder 9. It is preferable that a front panel 2 conceals the guides 17, 18, 19, and 20.

Figure 13:
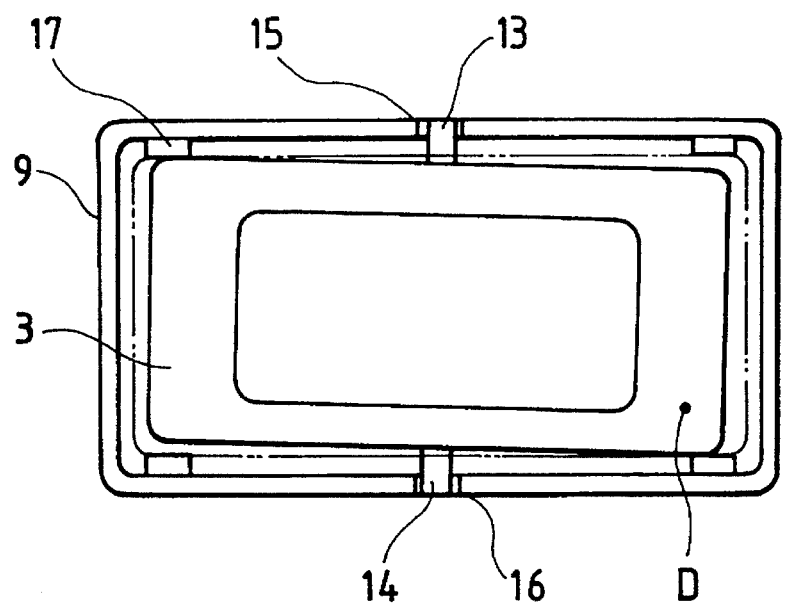
FIG. 13 is a sectional view of the display and the holder in the second embodiment which is similar to FIG. 11.
Figure 14:
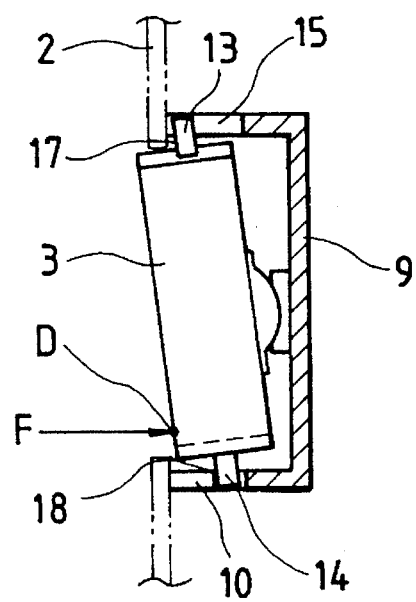
FIG. 14 is a sectional view of the display and the associated members in the second embodiment which is similar to FIG. 12.

With reference to FIGS. 13 and 14, when a right-hand lower corner "D" of the display 3 is pressed inward by a force "F", the display 3 is rotated relative to the holder 9 and the left-hand upper corner of the display 3 encounters the guide 17. The shafts 13 and 14 move in the grooves 15 and 16 and then encounter the walls of the holder 9 as the display 3 is rotated clockwise while being guided by the guide 17. Finally, the display 3 is rotated to a tilt position at which the display 3 inclines to the downward direction and the rightward direction with respect to the holder 9.

The embodiment of FIGS. 11 and 12 is advantageous in that the guides 17, 18, 19, and 20 and the shafts 13 and 14 enable smooth rotation of the display 3.

Third Embodiment

Figure 15:
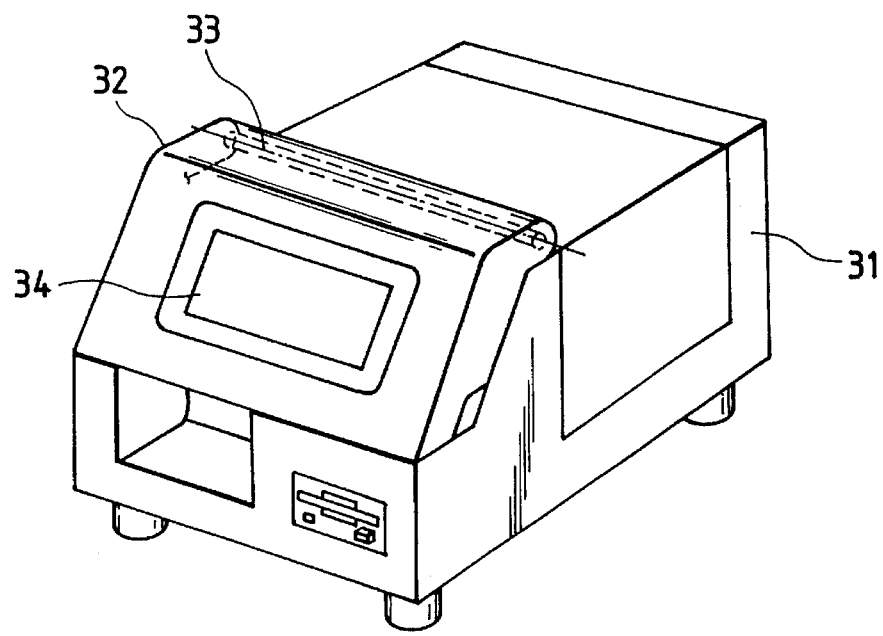
FIG. 15 is a perspective view of an electronic apparatus according to a third embodiment of this invention.
Figure 16:
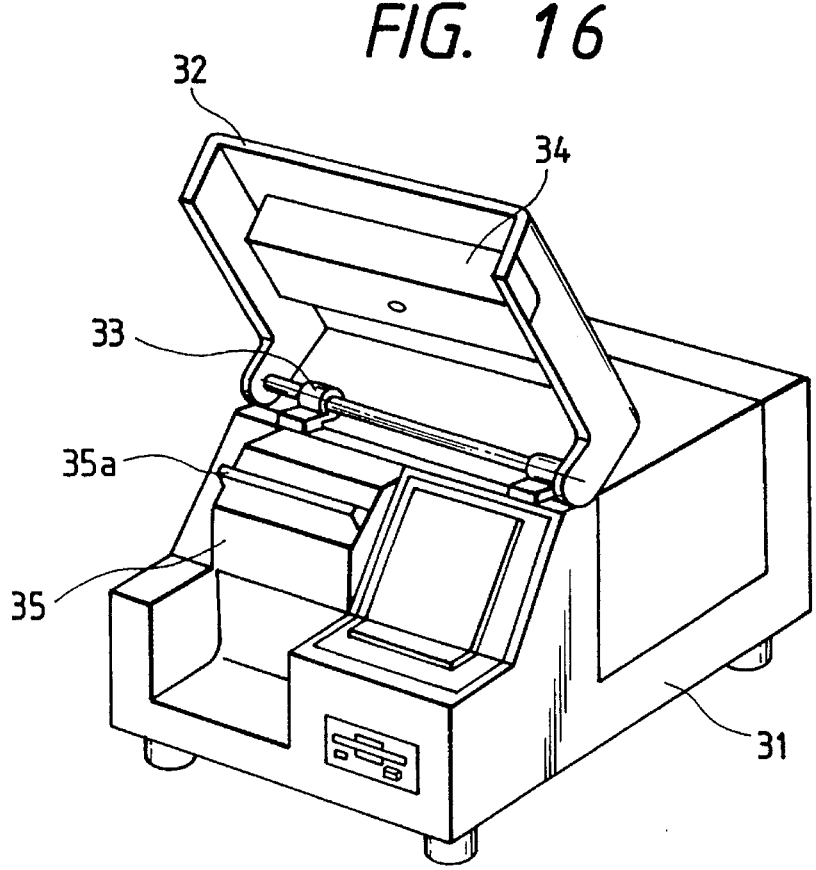
FIG. 16 is a perspective view of the electronic apparatus in the third embodiment in which a front panel assumes a fully open position.

With reference to FIGS. 15 and 16, an electronic apparatus includes a main body 31 on which a front panel 32 is rotatably mounted by a hinge 33. The front panel 32 can rotate between a closed position (a normal position) and a fully open position. FIG. 15 shows conditions in which the front panel 32 assumes the closed position (the normal position). FIG. 16 shows conditions in which the front panel 32 assumes the fully open position.

A display 34 is rotatably mounted on the front panel 32 by a modified ball-and-socket joint (a hemisphere-and-socket joint) as in the embodiment of FIGS. 1–10 or the embodiment of FIGS. 11–14.

Figure 17:
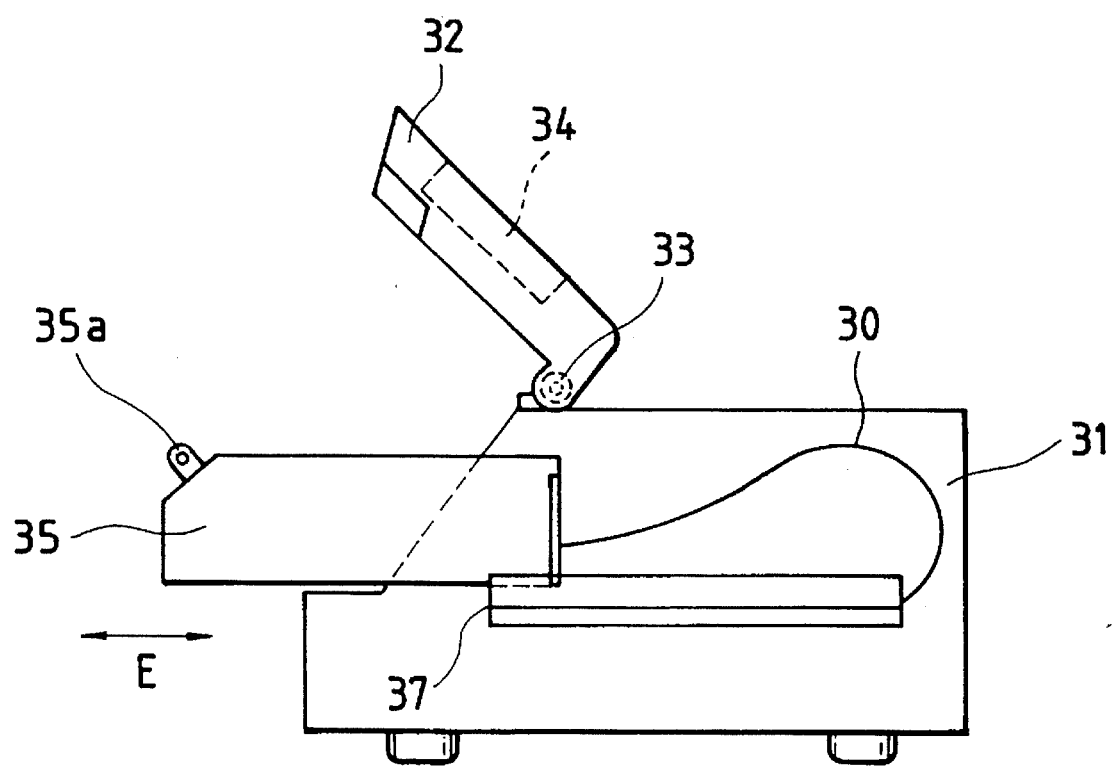
FIG. 17 is a diagrammatic side view of the electronic apparatus in the third embodiment.

As shown in FIG. 17, horizontally extending rails 37 are fixed within the apparatus body 31. A printer 35 is movably supported on the rails 37. The printer 35 can move while being guided by the rails 37. Specifically, the printer 35 can move in backward and forward directions "E" with respect to the apparatus body 31. A handle 35a is attached to a front of the printer 35. The printer 35 can be moved by operating the handle 35a.

An electronic circuit within the printer 35 and an electronic circuit within the apparatus body 31 are electrically connected via a flexible cable 30.

In the case where the front panel 32 assumes the fully open position as shown in FIG. 17, the printer 35 can be drawn from the apparatus body 31. Generally, the printer 35 is returned to a fully retracted position within the apparatus body 31 before the front panel 32 is closed.

In more detail, the front panel 32 selectively blocks and unblocks a path of movement of the printer 35. When the front panel 32 assumes the closed position, it blocks the path of movement of the printer 35. Accordingly, in this case, the printer 35 is usually held in the fully retracted position within the apparatus body 31. When the front panel 32 assumes the fully open position, it unblocks the path of movement of the printer 35. Accordingly, in this case, the printer 35 can move into and from the fully retracted position.

The electronic apparatus is advantageous as follows. The electronic apparatus is compact. Only when access to the printer 35 is required, the front panel 32 is opened and the printer 35 is drawn from the apparatus body 31. In other cases, the front panel 32 is closed while the printer 35 remains within the apparatus body. 31.

What is claimed is:

1. An electronic apparatus comprising:
    a main body;
    a front panel having a holder with a recess for receiving a display;
    a hinge for rotatably connecting the front panel to the main body;
    a display;
    a socket connected within said holder of the front panel;
    a hemispherical member being connected to the display and being rotatably received by the socket said hemispherical member being rotatable in all directions within an angular range permitting said display to be positioned within said holder; and
    means for pressing the hemispherical member against the socket.

2. The electronic apparatus of claim 1, wherein the holder having a recess in which at least a portion of the display is disposed, includes a first shaft projecting upward from a center of an upper portion of the display, and a second shaft projecting downward from a center of a lower portion of the display, the holder having a first groove into which the first shaft extends, the holder having a second groove into which the second shaft extends, wherein the first and second shafts are moveable in the first and second grooves.

3. The electronic apparatus of claim 1, further comprising:
    a printer;
    means for movably connecting the printer to the main body; and
    a flexible cable for electrically connecting the main body and the printer;
    wherein the front panel is rotatable between a closed position and an open position; the front panel blocks and unblocks a path of movement of the printer when the front panel assumes the closed position and the open position respectively; and the printer is movable into and from a retracted position within the main body in cases where the front panel is in the open position.

4. The electronic apparatus of claim 2, further comprising:
    a printer;
    means for movably connecting the printer to the main body; and
    a flexible cable for electrically connecting the main body and the printer;
    wherein the front panel is rotatable between a closed position and an open position; the front panel blocks and unblocks a path of movement of the printer when the front panel assumes the closed position and the open position respectively; and the printer is movable into and from a retracted position within the main body in cases where the front panel is in the open position.

5. An electronic apparatus comprising:
    a main body;
    a front panel;
    a hinge for rotatably connecting the front panel to the main body:
    a display;
    means for connecting the display to a recess within the front panel which enables rotation of the display in all directions relative to the front panel;
    a printer; and
    means for movably connecting the printer to the main body;
    wherein the front panel is rotatable between a closed position and an open position; the front panel blocks and unblocks a path of movement of the printer when the front panel assumes the closed position and the open position respectively; and the printer is movable into and from a retracted position within the main body in cases where the front panel is in the open position.

* * * * *